A. D. RASTETTER.
DEVICE FOR CONTROLLING THE CLUTCH LEVER.
APPLICATION FILED MAR. 30, 1915.

1,203,048.

Patented Oct. 31, 1916.

Witnesses:
Aa Hammond
Walter T. Estabrook

Inventor:
August D. Rastetter
By Vernon E. Hodge
his Atty.

UNITED STATES PATENT OFFICE.

AUGUST D. RASTETTER, OF EUREKA, ILLINOIS.

DEVICE FOR CONTROLLING THE CLUTCH-LEVER.

1,203,048. Specification of Letters Patent. Patented Oct. 31, 1916.

Application filed March 30, 1915. Serial No. 18,054.

*To all whom it may concern:*

Be it known that I, AUGUST D. RASTETTER, a citizen of the United States, residing at Eureka, in the county of Woodford and State of Illinois, have invented certain new and useful Improvements in Devices for Controlling the Clutch-Lever, of which the following is a specification.

This invention relates to an improvement in a device for controlling the speed or clutch lever, and the object is to provide means which will prevent the shifting of the clutch lever from neutral position to low position, when the brake lever has been applied.

The invention consists of other novel features of construction and combinations of parts which will be hereinafter described and pointed out in the claims.

Figure 1:
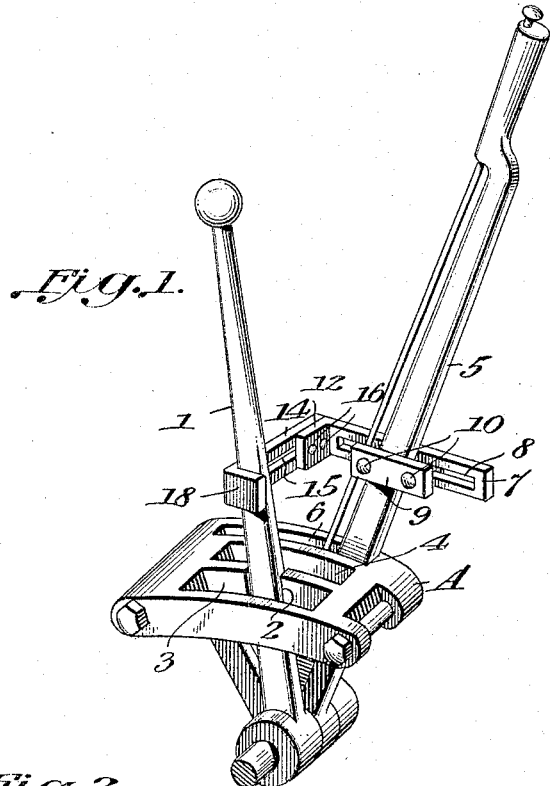
Figure 2:
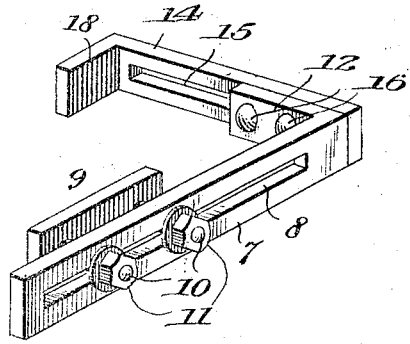
Figure 3:
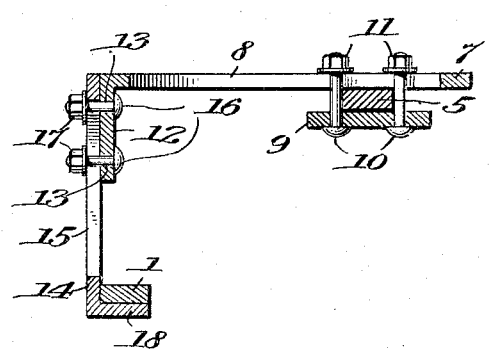

In the accompanying drawing:—Figure 1 is a perspective view showing the invention applied to a brake lever; Fig. 2 is a perspective view of the attachment; and Fig. 3 is a sectional view through the attachment.

A, represents a clutch quadrant, which consists of a plate provided with two parallel slots connected together at their centers by a transverse slot. A clutch or speed lever 1 is adapted to travel in the slots, and when in the transverse slot 2 is in neutral position. The outer slots 3 and 4 are traveled by the lever 1, and when at the outer end of slot 3 the clutch has been shifted to what is termed reverse position, and when the lever is at the inner end of the slot 3, it is in low position. The outer end of slot 4 represents the second position, and the inner end as third or high.

A brake lever 5 is received in an elongated slot 6, formed in the plate A, parallel with the slot 4, and connected to the lever is a bar 7 having an elongated slot 8. A clamp consisting of a plate 9 and bolts 10 connects the bar to the lever, the plate 9 engaging the lever 5, and the bolts 10 passing through the elongated slot 8 and fastened thereto by nuts 11, which hold the bar in its adjusted position with respect to the lever 5. The bar is provided with an arm 12 which extends at right angles thereto, and the arm is provided with holes 13. A plate 14 having an elongated slot 15 is connected to the arm 12 by means of bolts 16 passing through the slot 15, and holes 13 in the arm 12, and fastened thereto by nuts 17 for holding the plate in its adjusted position. The plate 14 is provided with a lip or projection 18, which extends at right angles thereto for closing the transverse slot 2 when the clutch or speed lever 1 is in neutral position, and the brake lever 5 has been moved to a position for applying the brakes to the car.

When the lip 18 has been brought to a position for closing the slot 2 the clutch lever cannot be moved to low, reverse, or second position or speed, but can be moved to high, but as it is almost impossible to start the car on high speed, the operator at once is warned that he has failed to release the brake. It is therefore, necessary that the brake lever 5 be thrown to off position before operating the clutch or speed lever 1. When the brake lever 5 is moved to off position the lip or projection 18 will be out of the way, as will the plate 14, the lip traveling along the quadrant frame A out of the path of lever 1 when thrown to reverse.

From the foregoing it will be seen that both the brake lever and clutch or speed lever are connected or locked together when the speed or clutch lever is in neutral position and the brake lever has been moved to a position for applying the brakes. This attachment will serve as a warning particularly to beginners that they must release the brake before starting the car to obtain the best results.

It is evident that many slight changes might be made in the form and arrangement of the several parts described, and I therefore do not wish to be limited to the exact construction herein set forth.

I claim:—

1. The combination with a clutch shifting frame, of a clutch lever mounted to move forwardly, rearwardly and laterally therein, a brake lever movably mounted in close proximity thereto, and means carried by the brake lever adapted to be directly engaged by the clutch lever to prevent its movement forwardly, rearwardly or laterally in one direction when the brake lever has been moved for applying the brakes.

2. The combination with a clutch shifting frame, of a clutch and a brake lever mounted to move therein, said clutch lever capable of movement to neutral, high, second, first and reverse positions, a plate connected to the brake lever, and a lip on the plate, said lip and plate preventing the movement of said clutch lever from neutral to first, reverse or second positions, when the brake lever has been moved to a position for applying the brakes.

3. The combination with a clutch shifting frame, of a clutch lever mounted to move forwardly and rearwardly in different planes and laterally therebetween, a brake lever mounted to move within said frame, and means carried by the brake lever adapted to be directly engaged by the clutch lever to prevent its movement forwardly and rearwardly in one plane, forwardly in another plane and laterally in one direction, when the brake lever has been moved for applying the brakes.

In testimony whereof I affix my signature, in the presence of two witnesses.

AUGUST D. RASTETTER.

Witnesses:
HERMAN BARKER,
J. F. PAGE.